Oct. 30, 1962     L. W. TAYLOR     3,061,107
FILTER CARTRIDGE AND METHOD OF MAKING THE SAME
Filed March 16, 1959     2 Sheets-Sheet 1
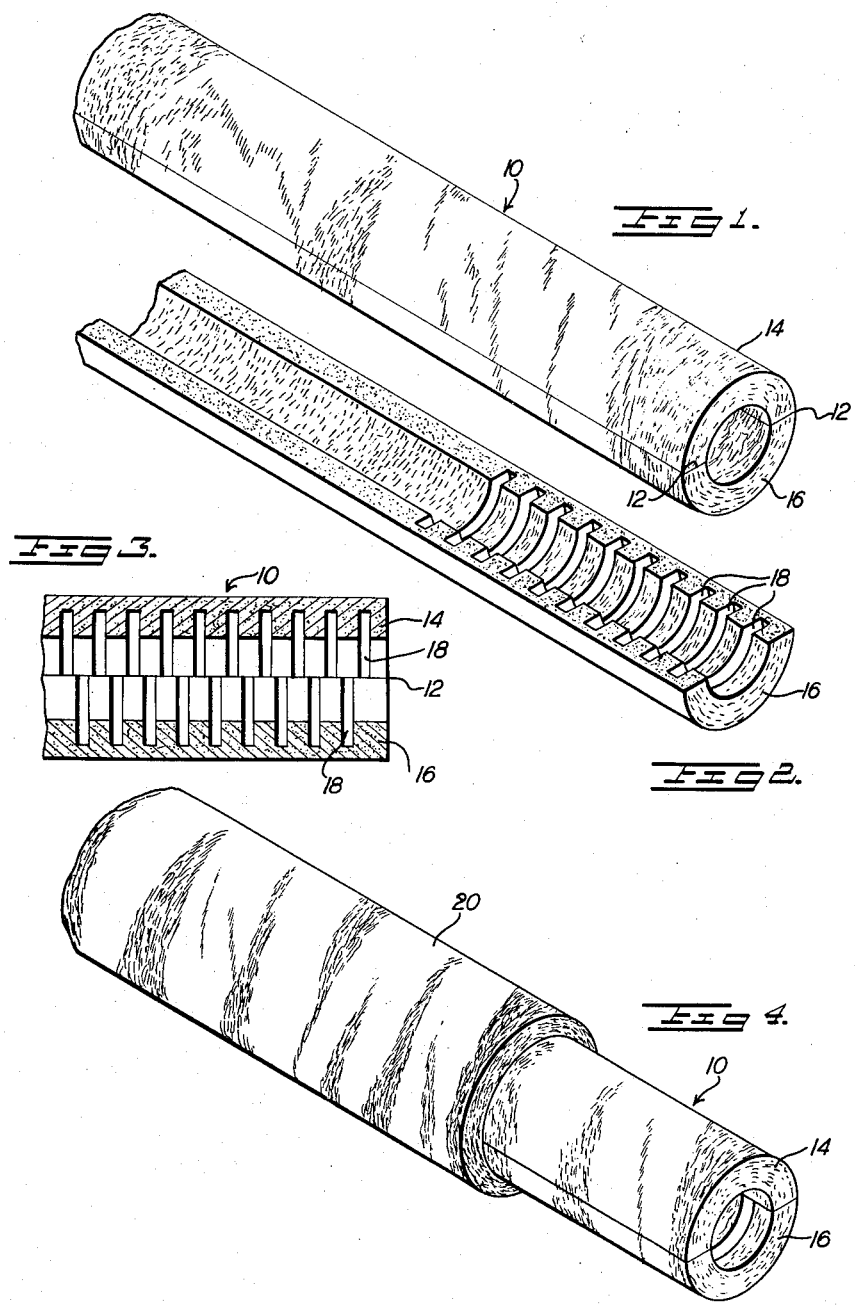
INVENTOR.
LUCIAN W. TAYLOR
BY
ATTORNEYS

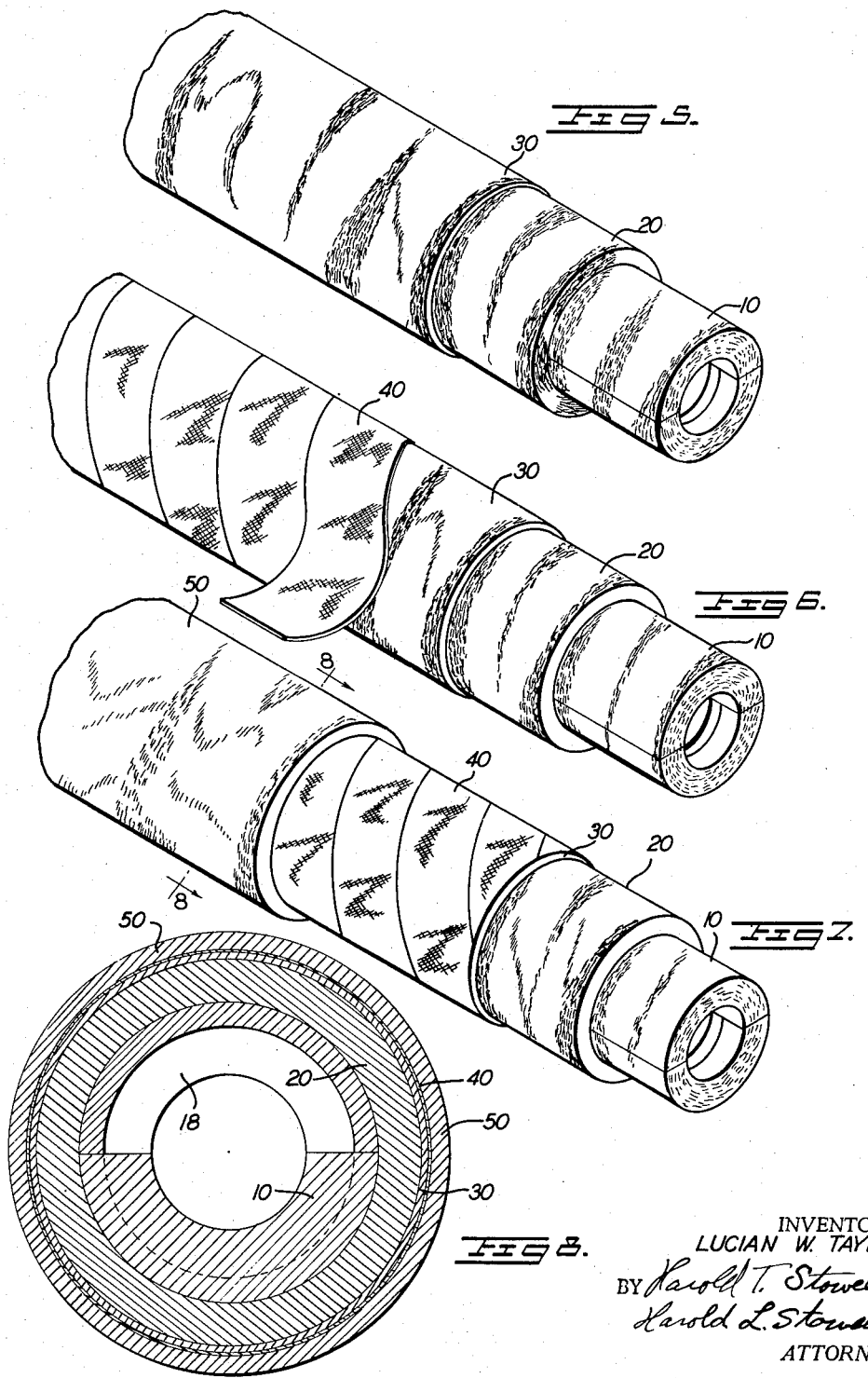

3,061,107
FILTER CARTRIDGE AND METHOD OF MAKING THE SAME

Lucian W. Taylor, 675 Arrowood Court, Los Altos, Calif.
Filed Mar. 16, 1959, Ser. No. 799,685
3 Claims. (Cl. 210—487)

The present invention relates to a fluid filtering and demulsifying cartridge for removing water as well as particulate matter from emulsions, such as water-liquid fuel emulsions and to a method of making the same.

Presently there is a great demand for filtering devices for removing liquid and solid contaminants from liquid fuels. The necessity for removing solids from fuels has been long appreciated; however, the necessity for removing an extremely high precentage of the liquid contaminants, for example, water, from fuels has within the past decade become extremely manifest in connection with fuels employed in high altitude aircraft where the temperature and pressure differentials between ground level and normal flight level create serious problems such as the formation of ice in the fuel system. The problem of removing the contaminants also has become more manifest as the total fuel consumption per unit time has increased due to an increase in commercial and military air traffic. In order to efficiently fuel the aircraft in the shortest possible time, it has become necessary to provide filtration devices which have very large capacities and are capable of high efficiencies in the removal of both solid and liquid contaminants. It is in these filtration devices that the present invention finds application.

The invention broadly comprises a cylindrical tube formed of glass fibers arranged in generally parallel relation transverse to the direction of fluid flow therethrough and includes at least two zones of decreasing average fiber diameter in the direction of fluid flow.

A more complete understanding of the invention will be obtained from the following detailed description when considered along with the attached drawings in which:

FIG. 1 is a perspective view of the innermost core or elongate cylinder of the filter cartridge, FIG. 2 is a perspective view of one-half of the core shown in FIG. 1 illustrating slots formed in the inner portion thereof to provide an increased filtering surface area, FIG. 3 is a sectional view of the core illustrated in FIG. 1 taken along line 3—3 thereof showing the staggered relationship between the slots formed in the inner peripheral wall of the core, FIG. 4 is a perspective view partially cut away showing a second layer of filtering medium disposed about the core illustrated in FIGS. 1, 2 and 3, FIG. 5 is a perspective view similar to FIG. 4 showing a third layer of filtering material disposed about the structure shown in FIG. 4, FIG. 6 is a perspective view partially cut away showing a screen cloth wrap helically disposed about the structure shown in FIG. 5, FIG. 7 is a perspective view partially cut away of the completed filter cartridge element, and FIG. 8 is a sectional view of the filter cartridge element taken along line 8—8 of FIG. 7.

Referring to the drawing, and more particularly to FIG. 1, there is shown an inner core element 10 comprised of a layer of fiber glass material impregnated with an uncured binder such as phenolic resin. The glass fibers which constitute the core 10 are arranged generally parallel to one another and in the assembled form extend along paths substantially transverse to the direction of fluid flow therethrough.

The fiber glass material in its uncured state is suitably wrapped about a mandrel and thereafter cured by being exposed to an elevated temperature. The curing process causes the thermosetting resin binder material to harden and thereby cause the individual glass fibers of the core 10 to assume and permanently maintain the shape of the mandrel which is in the illustrated embodiment a right circular cylinder. It will be understood that although the preferred embodiment is shown to be circular in cross-section, many other shapes could be satisfactorily employed.

To increase the effective filtering surface area of the interior of the core 10, the core is severed along the lines 12 into sections 14 and 16. Then arcuate slots 18 are formed in the wall of the core 10. These slots are typically formed in the sections 14 and 16 by removing the cured fiber glass material by a sawing operation; however, it is contemplated that the slots may also be formed in other manners such as, for example, by properly shaping the mandrel on which the fiber glass layer of the core 10 is initially wrapped.

It will be observed from an examination of FIG. 3 that the slots 18 are formed in the sections 14 and 16 so that when the core 10 is reassembled, the slots in one of the sections are in a staggered relation with respect to the slots formed in the other section. By staggering the slots in this manner, it has been found the mechanical strength imparted to the material between the slots is increased in comparison with a structure wherein the slots are formed as complete annuli around the interior wall of the core 10.

When the core 10 is reassembled as shown in FIG. 3, a layer 20 of fiber glass material impregnated with an uncured thermosetting resin is wrapped coaxially about the core 10, as illustrated in FIG. 4. The layer 20 is made up of glass fibers of an average diameter slightly smaller than the average diameter of the glass fibers in the core 10 and are disposed generally parallel to one another and extend along paths which are substantially transverse to the direction of fluid flow therethrough. The layer 20 is then temporarily held in place while a third layer 30 of fiber glass material impregnated with an uncured thermosetting resin is wrapped firmly about the outer surface of the layer 20 as illustrated in FIG. 5. The layer 30 is made up of glass fibers of a slightly smaller average diameter than the average diameter of the fibers in the layer 20; and as in the layer 20, the glass fibers are disposed parallel to one another and extend along paths substantially transverse to the direction of fluid flow therethrough.

Following the disposition of the layer 30 on the layer 20, a strip 40 of screen cloth is helically wrapped around the entire assembly as shown in FIG. 6. Satisfactory results have been obtained by employing a screen cloth made of glass fibers, but it must be understood that under certain circumstances, the screen cloth could be metal, nylon or any other material with good tensile strength and insoluble in the fluid being filtered. In applying the screening cloth wrap 40 to the assembly, care must be taken to avoid any wrinkling of the material in the layer 30 in order that a substantially uniform mass of fibrous material is exposed to the transient fluid being filtered. The helical wrap 40 is effective to impart to the assembly sufficient mechanical strength to withstand the tensile load applied thereto by the pressure of the transient fluids within the system in which the filter cartridge of the application is to be employed.

With the layers 20, 30 and the spiral wrap 40 held in place on the core 10, the assembly is exposed to an elevated temperature to cure the binder material. When the assembly is suitably cured, an outer layer or material 50 is wrapped about the assembly as illustrated in FIG. 7. The glass fibers which make up the layer 50 are generally parallel to one another and extend in an annular fashion around the assembly and are generally transverse to the direction of fluid flow therethrough. The diameter of the glass fibers of the outer layer 50 are relatively coarse and of substantially the same order as the average diameter of the glass fibers which make up the inner core 10. With the outer layer 50 suitably held in position about the assembly, the entire filter unit is once again exposed to an elevated temperature to cure the binder material of the outer layer 50.

It has been found that in order to impart increased rigidity and to also block any flow of fluid through the ends of the tubes, the ends may be dipped in a suitable resinous material to the extent of the order of one quarter of an inch.

In the filter cartridge assembly set forth in the foregoing description, the individual layers of fiber glass material 10, 20, 30 and 50 are effective to filter out various particle sizes from the fluid being filtered as well as a liquid contaminant such as water. It must be understood that the filtering quality of the filter such as described hereinabove is a function of the glass fiber intersections which, in turn, is a function of the fiber diameter and the density of the glass fiber materials of the individual layers. The core 10 being of relatively coarse fibers is effective to prevent the flow of the relatively large solid contaminants which are in the fluid being filtered; the layers 20 and 30 being of progressively finer fibers, respectively, are effective to collect the smaller diameter solid contaminants; and the screen cloth material 40 is effective to retain the desired contour of the filter element and has sufficient tensile strength to suitably withstand the pressure differentials during the filtering operation. It must be understood that the fiber glass material of all the layers is effective at least to some extent to coalesce the fluid contaminant in the fluid being filtered. In this instance, the term "coalesce" refers to the breaking of, for example, of a water-fuel emulsion wherein the small water droplets unite with other small droplets thereby forming larger droplets.

The layer 50, which is referred to as the coalescing layer is effective to complete the separation of the liquid contaminant such as water from the transient fluid being filtered. With particular reference to water, it has been found that water has an affinity to the surface of the individual glass fibers and will collect on the surface of these fibers initially forming small droplets. These small droplets unite and form larger droplets at the intersections of two or more fibers. After being forced to the outer surface of the filtering element the large droplets of water will drop from the filtering cartridge by gravity and will be suitably collected at the bottom of the housing in which the filter cartridges of the invention are employed. Therefore, it will be seen that the filter cartridge described is effective to remove not only the solid contaminants in the fluid being filtered but also the liquid contaminants allowing only the desired demulsified fluid to pass therethrough.

An example of a filter cartridge constructed in accordance with the invention intended for flow from the inside to the outside thereof of the fluid to be filtered and specifically designed to remove solid and liquid contaminants from JP-5 jet aircraft fuel is as follows:

The average diameter of the glass fibers of the various layers:

|  | Inches |
|---|---|
| Core 10 | .00022 |
| Layer 20 | .00015 |
| Layer 30 | .00005 |
| Layer 50 | .00028 |

Density of the various layers:

|  | Lbs./cubic foot |
|---|---|
| Core 10 | 6–8 |
| Layer 20 | 6–8 |
| Layer 30 | 6–8 |
| Layer 50 | 6–8 |

The bonding agent employed was phenol formaldehyde.

It has also been found that the range of fiber diameters for the various layers is as follows:

|  | Inches |
|---|---|
| Core 10 | .00020–.00055 |
| Layer 20 | .00013–.00025 |
| Layer 30 | .00003–.00005 |
| Layer 50 | .00025–.00055 |

Also, the range of densities for each section has been found to be of the order of from 5 to 15 pounds per cubic foot.

In addition to the above referred to binder, other binders such as, for example, melamine and silicones may be satisfactorily employed.

A fluid filtering and demulsifying element 20 inches long and having an outside diameter of 3¾ inches, constructed in accordance with the invention, achieved the following results:

Flow rate of 17.5 gallons per minute of JP-5 fuel contaminated with 3% of $H_2O$ and 80 milligrams per liter of red ferric oxide ($Fe_2O_3$). At the end of a 47 minute run, the fuel effluent analysis showed 0.1 milligram per liter of solids and no free water.

The filter cartridges of the invention can be satisfactorily employed as the filter elements in the conventional type filters such as the systems shown and described in U.S. Patent 2,539,768; 2,800,232; and Re. 24,136 wherein the fluid to be filtered flows through the center of the cartridge and then radially outwardly through the cartridge whereupon the solid and liquid contaminants are removed and the filtered fluid emerges at the outer periphery of the cartridge. Although the systems illustrated in the above-referred-to patents show cartridges which are disposed in a vertical manner, it must be understood that the filter elements of the invention function equally satisfactorily when disposed in a horizontal manner.

In certain instances it may be desired to employ a filter cartridge constructed in accordance with the invention wherein there is no binder material in the completed cartridge. The process and method of constructing the filter is similar to that set forth in the foregoing description; however, the cartridge after being constructed is heat cleaned. Heat cleaning is a process whereby the binder material is removed from the completed cartridge. More specifically, after the final layer of fiber glass material impregnated with the binder material has been cured, thereby suitably shaping the individual fibers, the cartridge is exposed to an elevated temperature sufficient to burn out all of the binder material. After completion and burning out of all of the binder material by the heat cleaning process, the fiber glass element will maintain its density and shape due to the fact the individual glass fibers take a set during the binder curing steps and/or the heating-cleaning step. It will be readily apparent to those skilled in the art that the resultant graded, molded fiber glass filter element could not be achieved unless a bonded fiber glass material is employed in the initial manufacturing steps. Since a heat cleaned filter element does not have the inherent strength of a cartridge with the cured binder material, internal and external supporting means such as perforated metal cylinders may be satisfactorily employed as a support for the heat cleaned filter.

Although the embodiment of the invention illustrated and described in the foregoing description refers to an inside-out fluid flow, it will be understood that the principles of a graded and molded fiber glass filter cartridge could be employed in a filter cartridge for outside-in fluid flow. In an outside-in filter, the arrangement of the various layers of fiber glass material is reversed so that the fiber diameter variation is the same with respect to the influent.

It has been advantageous in some applications to employ an outer wrap of a knitted material, such as, for example, cotton, which acts to prevent glass fiber migration; attrition of the exposed glass fibers of the filter cartridge element during handling and operation; and also is effective to increase the coalescing properties of the filter cartridge.

According to the provisions of the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A hollow cylindrical fluid filtering and demulsifying cartridge adapted for radially outward flow therethrough of pressure fluid to be filtered and demulsified, said cartridge creating a pressure drop across the radial thickness thereof and the pressure of the fluid tending to distort said cartridge outwardly, comprising: a plurality of superposed concentric hollow cylinders each formed of a mass of substantially parallel glass fibers predominantly oriented with the lengths thereof disposed in radial planes normal to the axis of the cylinders and with the glass material thereof heat set with said lengths curved along arcs of radii of the cylinders, the innermost cylinder having a plurality of axially spaced cut grooves on the inner surface thereof, the lengths of said grooves being parallel to the lengths of said fibers.

2. In a method of forming a filtering and demulsifying cartridge, the steps which comprise: wrapping a first layer of uncured resin impregnated glass fibers of predominantly parallel orientation circumferentially around a generally cylindrical form with the lengths of said fibers disposed predominantly in the circumferential direction of the wrap, whereby the lengths of said fibers are curved along arcs generally parallel to arcs along the circumference of the form; then raising the temperature of said impregnated layer until the resin sets and said fibers assume arcuate sets whereby said first layer constitutes a rigid self-sustaining substantially cylindrical core; then cutting a plurality of axially spaced grooves on the inner surface of said cylindrical core with the lengths of said grooves parallel to the lengths of said fibers; then wrapping a second layer of uncured resin impregnated glass fibers of less diameter than those of the first and of predominantly parallel orientation circumferentially around said core with the lengths of the last-named fibers disposed predominantly in the circumferential direction of the wrap, whereby the lengths of the last-named fibers are curved along arcs generally parallel to arcs along the circumference of the core; and then raising the temperature of the core and second layer until the resin in the second layer sets and the fibers in the second layer assume arcuate sets.

3. A hollow cylindrical fluid filtering and demulsifying cartridge adapted for radially outward flow therethrough of pressure fluid to be filtered and demulsified, said cartridge creating a pressure drop across the radial thickness thereof and the pressure of the fluid tending to distort said cartridge outwardly, comprising: a plurality of superposed concentric hollow cylinders each formed of a mass of substantially parallel glass fibers predominantly oriented with the lengths thereof disposed in radial planes normal to the axis of the cylinders and with said lengths curved along arcs of radii of the cylinders, the innermost cylinder having a plurality of axially spaced cut grooves on the inner surface thereof, the lengths of said grooves being parallel to the lengths of said fibers.

References Cited in the file of this patent

UNITED STATES PATENTS

| | | |
|---|---|---|
| 1,881,932 | Powell | Oct. 11, 1934 |
| 2,148,708 | Orr | Feb. 28, 1939 |
| 2,184,316 | Plummer | Dec. 26, 1939 |
| 2,220,127 | Slayter | Nov. 5, 1940 |
| 2,395,301 | Sloan | Feb. 19, 1946 |
| 2,500,665 | Courtright | Mar. 14, 1950 |
| 2,546,230 | Modigliani | Mar. 27, 1951 |
| 2,657,808 | Mankin | Nov. 3, 1953 |
| 2,670,851 | Curtis | Mar. 2, 1954 |
| 2,687,363 | Manning | Aug. 24, 1954 |
| 2,701,062 | Robinson | Feb. 1, 1955 |
| 2,782,933 | Monsarrat | Feb. 26, 1957 |
| 2,864,505 | Kasten | Dec. 16, 1958 |
| 2,911,101 | Robinson | Nov. 3, 1959 |
| 2,953,249 | Topol | Sept. 20, 1960 |

FOREIGN PATENTS

| | | |
|---|---|---|
| 709,897 | Great Britain | June 2, 1954 |